(12) United States Patent
Chen

(10) Patent No.: US 9,534,689 B2
(45) Date of Patent: Jan. 3, 2017

(54) METAL SEAL RING

(71) Applicant: FMC Technologies, Inc., Houston, TX (US)

(72) Inventor: Chi-Li Chen, Houston, TX (US)

(73) Assignee: FMC Technologies, Inc., Houston, TX (US)

( * ) Notice: Subject to any disclaimer, the term of this patent is extended or adjusted under 35 U.S.C. 154(b) by 85 days.

(21) Appl. No.: 14/639,435

(22) Filed: Mar. 5, 2015

(65) Prior Publication Data

US 2016/0258534 A1    Sep. 8, 2016

(51) Int. Cl.
*E21B 33/03*    (2006.01)
*F16L 23/20*    (2006.01)
*F16J 15/06*    (2006.01)
*E21B 33/035*   (2006.01)
*F16J 15/08*    (2006.01)

(52) U.S. Cl.
CPC ............ *F16J 15/062* (2013.01); *E21B 33/035* (2013.01); *F16J 15/08* (2013.01)

(58) Field of Classification Search
CPC .......... F16L 23/16; F16L 23/162; F16L 23/18; F16L 23/20; E21B 33/00; E21B 33/03; E21B 2033/005; F16J 15/061; F16J 15/062; F16J 15/08; F16J 15/0806
See application file for complete search history.

(56) References Cited

U.S. PATENT DOCUMENTS

| 2,766,999 | A | * | 10/1956 | Watts | E21B 33/04 |
| | | | | | 285/334.2 |
| 4,390,186 | A | | 6/1983 | McGee et al. | |
| 4,470,609 | A | * | 9/1984 | Poe | F16L 23/18 |
| | | | | | 277/623 |
| 5,039,140 | A | * | 8/1991 | Szymczak | E21B 33/03 |
| | | | | | 285/334.2 |

(Continued)

FOREIGN PATENT DOCUMENTS

EP    0306127  A2    3/1989
GB    2453843  A    4/2009

(Continued)

OTHER PUBLICATIONS

International Search Report and Written Opinion dated May 9, 2016 of PCT/US2016/016108 filed on Feb. 2, 2016.

*Primary Examiner* — Gilbert Lee
(74) *Attorney, Agent, or Firm* — Amerson Law Firm, PLLC

(57) ABSTRACT

A metal seal ring disclosed herein includes a front side surface having a plurality of first sealing areas and second sealing areas, and a back side surface having a plurality of spaced-apart protrusions having a radially innermost surface located at a first radial distance from a longitudinal axis of the seal and a first axial distance from an axis of symmetry of the seal. The back side also includes a plurality of recesses located between one of the protrusions and the axis of symmetry, each recess having a radially outermost surface located at a second radial distance from the longitudinal axis and a second axial distance from the axis of symmetry. A (Continued)

ratio of the second axial distance to the first axial distance falls within the range of about 0.38-0.63, and a ratio of the second radial distance to the first radial distance falls within the range of about 0.79-1.32

21 Claims, 12 Drawing Sheets

(56) References Cited

U.S. PATENT DOCUMENTS

| | | | | |
|---|---|---|---|---|
| 5,058,906 A | * | 10/1991 | Adamek | F16L 17/08 |
| | | | | 277/614 |
| 5,103,915 A | * | 4/1992 | Sweeney | E21B 33/03 |
| | | | | 166/379 |
| 5,120,086 A | * | 6/1992 | Nock | F16L 19/0283 |
| | | | | 285/328 |
| 5,174,376 A | | 12/1992 | Singeetham | |
| 5,839,765 A | * | 11/1998 | Carter | F16L 23/18 |
| | | | | 277/603 |
| 5,997,003 A | | 12/1999 | Turner | |
| 7,025,360 B2 | * | 4/2006 | Walker | E21B 33/03 |
| | | | | 277/627 |
| 8,226,089 B2 | * | 7/2012 | Pallini, Jr. | E21B 17/04 |
| | | | | 277/339 |
| 2003/0000694 A1 | | 1/2003 | Sweeney et al. | |
| 2008/0048443 A1 | | 2/2008 | Paton et al. | |
| 2009/0194945 A1 | | 8/2009 | Bhat et al. | |
| 2009/0322030 A1 | | 12/2009 | Pallini, Jr. et al. | |
| 2010/0327532 A1 | | 12/2010 | Thomson | |

FOREIGN PATENT DOCUMENTS

| | | |
|---|---|---|
| WO | 2008016358 A | 2/2008 |
| WO | 2013/139729 A2 | 9/2013 |

* cited by examiner

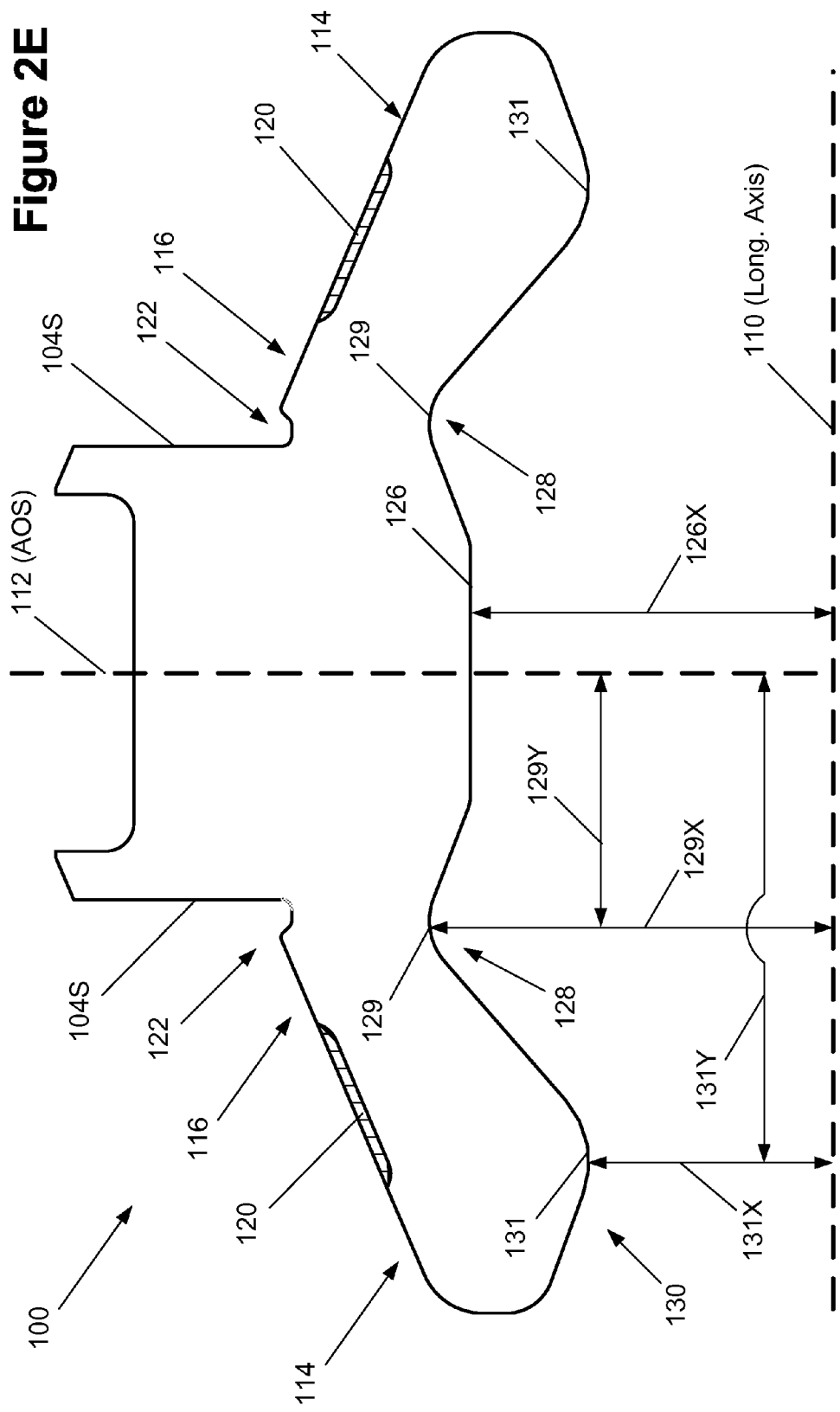

METAL SEAL RING

BACKGROUND OF THE INVENTION

1. Field of the Invention

The present disclosure is directed to an improved metal seal ring that is used to establish a sealed connection between two mating components.

2. Description of the Related Art

In many industries, a sealing connection must be established between two mating tubular components. In some applications, the sealing connection is established by use of a connector that contains a locking means for clamping the hubs of the two components together, with a metal seal positioned therebetween, so as to establish the seal between the two components. The structure and configurations of the hubs, the metal seal and the connector, as well as the mechanisms used to establish the sealing connection between such hubs is vast and varied.

FIG. 1 simplistically depicts one illustrative application in the oil and gas industry where a metal seal ring or seal ring 14 is employed to achieve a sealed connection between two tubular components 12A, 12B. Subsea wells normally have a large tubular wellhead 12A (i.e., a first tubular component) positioned at the sea floor. A riser 12B (i.e., a second tubular component) that extends from the wellhead to the surface, e.g., to a drill ship or a platform, is used during at least drilling operations. As will be appreciated by those skilled in the art, the illustrative riser is but one example of various components that may be coupled to a subsea wellhead. Other examples include, but are not limited to, tubing heads, Christmas trees, etc. The second component 12B is adapted to be sealingly coupled to the wellhead 12A by the use of a simplistically depicted metal seal ring 14 and a hydraulically actuated connector 16. In a subsea application, the metal seal ring 14 must provide a seal that prevents high pressure fluids within the well from escaping to the ocean and provide a seal that prevents ingress of sea water into the well due to external hydrostatic pressure. Typically, the sealing connection between the two components 12A, 12B is established by actuating one or more hydraulic cylinders to force "dogs" into engagement with a profile (e.g., grooves) formed in the outer surface of the wellhead 12A. When installation is complete, the sealing surfaces 14A of the seal ring 14 sealingly engage the components 12A, 12B. Another example from the oil and gas industry is subsea flow lines wherein connections must be made between two tubular shaped flow lines that carry hydrocarbon fluids and gases. Of course, there are many industrial applications where such connections must be established that are not in a subsea environment, e.g., refineries and petrochemical plants, onshore drilling operations, etc. Additionally, as will be appreciated by those skilled in the art, there are many forms of tubular components, seals and connectors employed within many industries. Moreover, the vertical orientation of the components 12A/12B shown in FIG. 1 is by way of example only, as they may be oriented in any direction.

The present disclosure is directed to various embodiments of an improved metal seal ring that is used to establish a sealed connection between two mating components.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Generally, the present disclosure is directed to various embodiments of an improved metal seal ring that is used to establish a sealed connection between two mating components. One illustrative example of a metal seal ring disclosed herein includes, among other things, a flange, a front side surface comprised of a plurality of first sealing areas and a plurality of second sealing areas, each of the second sealing areas being located between the flange and one of the first sealing areas, and a back side surface that is comprised of a plurality of spaced-apart protrusions, each of which has a radially innermost surface that is located at a first radial distance from a longitudinal axis of the seal and a first axial distance from an axis of symmetry of the seal, and a plurality of recesses, each of which is located between one of the protrusions and the axis of symmetry, wherein each recess has a radially outermost surface that is located at a second radial distance from the longitudinal axis and a second axial distance from the axis of symmetry. In this embodiment, a ratio of the second axial distance to the first axial distance falls within the range of about 0.38-0.63, and a ratio of the second radial distance to the first radial distance falls within the range of about 0.79-1.32

Another illustrative example of a metal seal ring disclosed herein includes, among other things, a flange and a plurality of sealing members extending from the flange, wherein each of the sealing members comprises a front side surface comprising a first sealing area and a second sealing area, wherein the second sealing area is located between the flange and the first sealing area, and a back side surface, wherein the back side surface comprises a protrusion which has a radially innermost surface and a first radial thickness as measured from the radially innermost surface to the front side along a line that is parallel to an axis of symmetry of the seal body, and a recess that is located between the protrusion and the axis of symmetry, the recess having a radially outermost surface and a second radial thickness as measured from the radially outermost surface to the front side along a line that is parallel to the axis of symmetry, wherein the second radial thickness is less than the first radial thickness.

Yet another illustrative example of a metal seal ring disclosed herein includes, among other things, a flange and a plurality of sealing members extending from the flange, wherein each of the sealing members comprises a front side surface comprised of a plurality of first sealing areas and a plurality of second sealing areas, each of the second sealing areas being located between the flange and one of the first sealing areas. In this embodiment, each of the sealing members, when viewed in a cross-section that includes a longitudinal axis of the seal ring, comprises a plurality of spaced-apart protrusions, each of which has a radially innermost surface that is located at a first axial distance from the axis of symmetry and a centroid, the center of which is located a centroid axial distance from the axis of symmetry, wherein the first axial distance is greater than or equal to the centroid axial distance.

In another illustrative example, the metal seal ring includes a flange and a plurality of sealing members that extend from the flange, wherein each of the sealing members has a front side surface comprised of a plurality of first sealing areas and a plurality of second sealing areas, each of the second sealing areas being located between the flange and one of the first sealing areas. Additionally, each of the sealing members, when viewed in a cross-section that includes the longitudinal axis of the seal ring, has an axial length from the flange as measured in a direction parallel to the longitudinal axis of the seal body and a centroid that is located at a centroid axial distance from the flange as measured in a direction parallel to the longitudinal axis, wherein the centroid axial distance is greater than one-third of the axial length of the sealing member.

Yet another example of a metal seal ring disclosed herein includes, among other things, a flange, a front side surface and a back side surface. In this example, the front side surface is comprised of a plurality of first sealing areas and a plurality of second sealing areas, each of the second sealing areas being located between the flange and one of the first sealing areas. Additionally, the back side surface comprises a plurality of spaced-apart protrusions, each of which has a radially innermost surface that is located at a first radial distance from the longitudinal axis of the seal and a first axial distance from the axis of symmetry of the seal, and a plurality of recesses, each of which is located between one of the protrusions and the axis of symmetry. In this embodiment, each recess has a radially outermost surface that is located at a second radial distance from the longitudinal axis and a second axial distance from the axis of symmetry, wherein the second radial distance is greater than the first radial distance and the second axial distance is less than the first axial distance.

BRIEF DESCRIPTION OF THE DRAWINGS

The disclosure may be understood by reference to the following description taken in conjunction with the accompanying drawings, in which like reference numerals identify like elements, and in which:

FIGS. 2A-2K are simplistic and schematic drawings of a novel metal seal ring disclosed herein.

Figure 1:
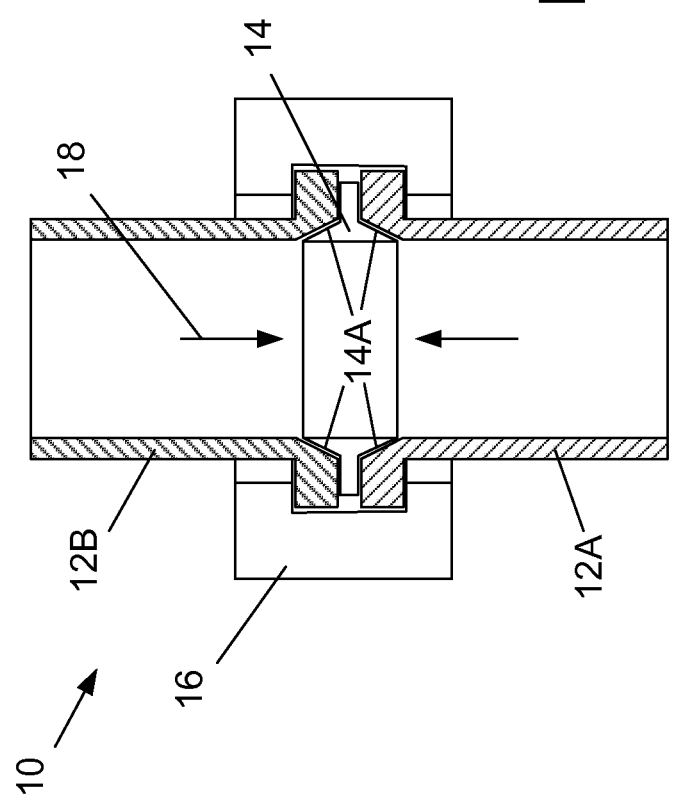
FIG. 1 is a simplistic and schematic drawing of a prior art application where a metal seal ring is used to establish a sealed connection between two mating tubular components.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures, systems and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 2A:
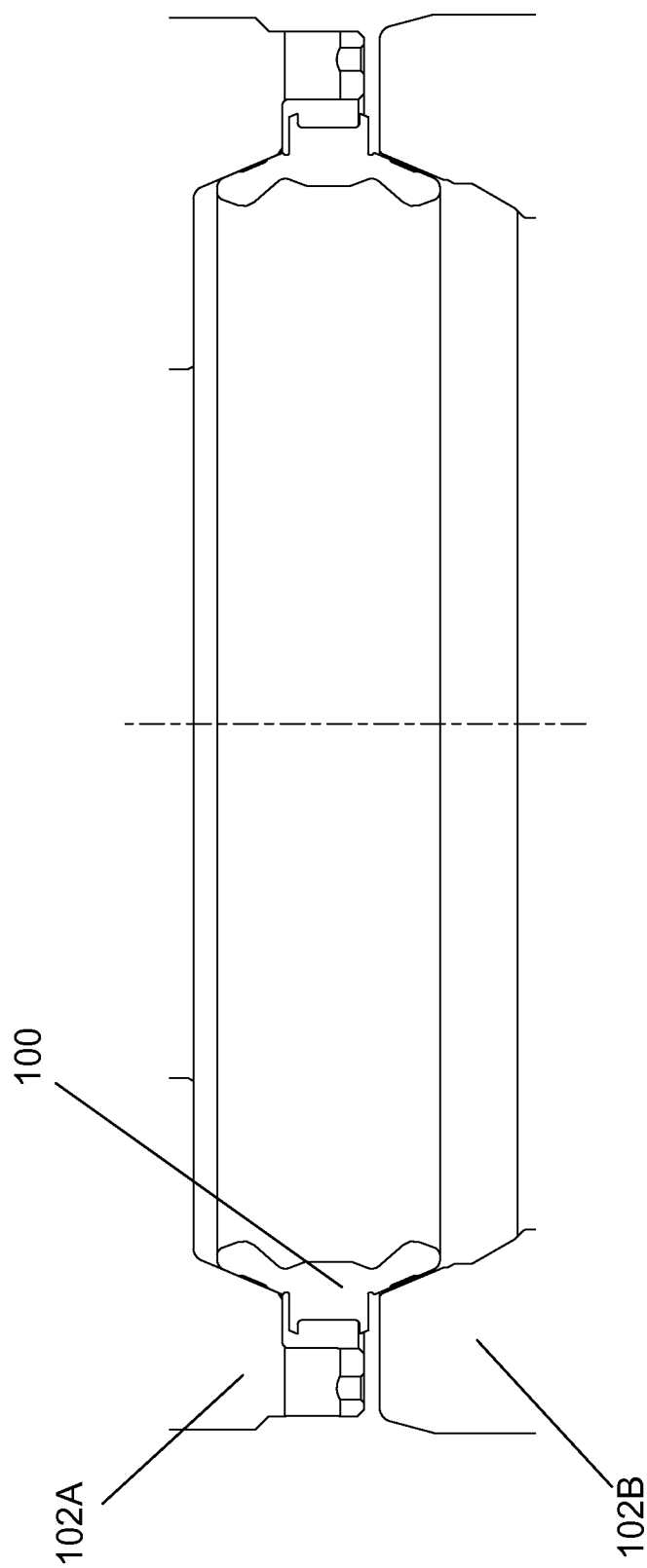

The present disclosure is generally directed to various embodiments of an improved metal seal ring that is used to establish a sealed connection between two mating components. FIGS. 2A-2K are simplistic and schematic drawings of one illustrative embodiment of a novel metal seal ring 100 disclosed herein. FIG. 2A is a cross-sectional side view that depicts the metal seal ring 100 disposed between two tubular members or components 102A, 102B. The tubular members 102A, 102B are intended to be representative in nature of any type of components wherein a sealing connection may be established between the two components using a metal seal ring, e.g., a well head and a tubing head, a well head and a Christmas tree, two flow lines, two sections of pipe, etc. The two components may be coupled to one another using any of a variety of different means and structures, e.g., a hydraulic or manually actuated clamp, a bolted connection, etc. Thus, the presently disclosed inventions should not be considered to be limited to any particular application, to any particular type of components 102A, 102B, nor to the manner in which the two components 102A, 102B are coupled together.

Figure 2B:
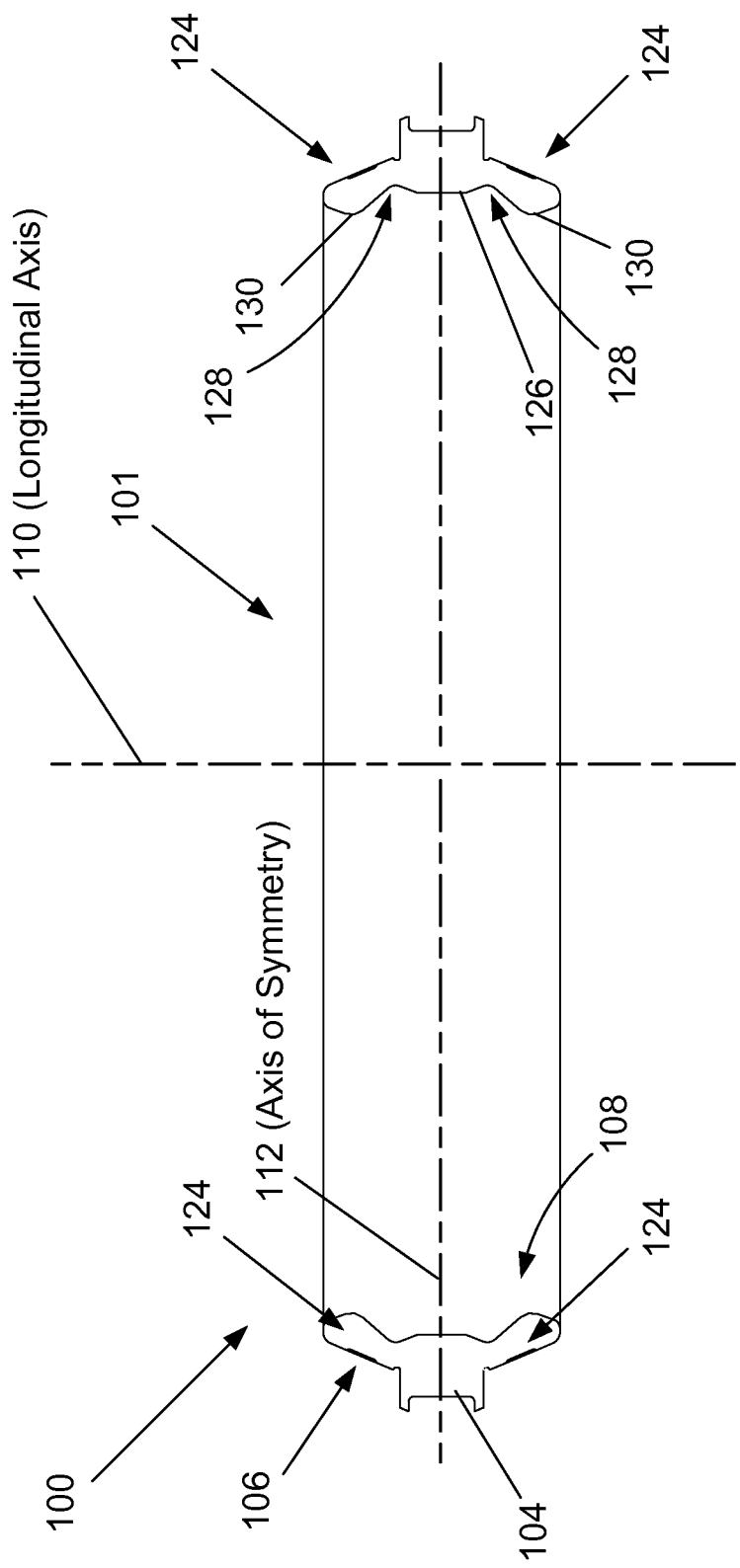

Further aspects of the illustrative metal seal ring 100 disclosed herein will now be discussed with reference to FIGS. 2B-2D. FIG. 2B is an enlarged cross-sectional view of the illustrative embodiment of the metal seal ring 100 disclosed herein. In general, the metal seal ring 100 has an integral body that is comprised of a flange 104 and two sealing members 124 that extend away from the flange 104. The metal seal ring 100 has a front side (or sealing side) 106 and a back side 108 (non-sealing side). The back side 108 is comprised of an inner surface 126, a plurality of protrusions 130, and a plurality of recesses 128 positioned between the flange 104 and the protrusions 130. The metal seal ring 100 defines an opening 101 with a longitudinal axis 110. The metal seal ring 100 also has an axis of symmetry (AOS) 112 that is oriented orthogonally relative to the longitudinal axis 110.

Figure 2C:
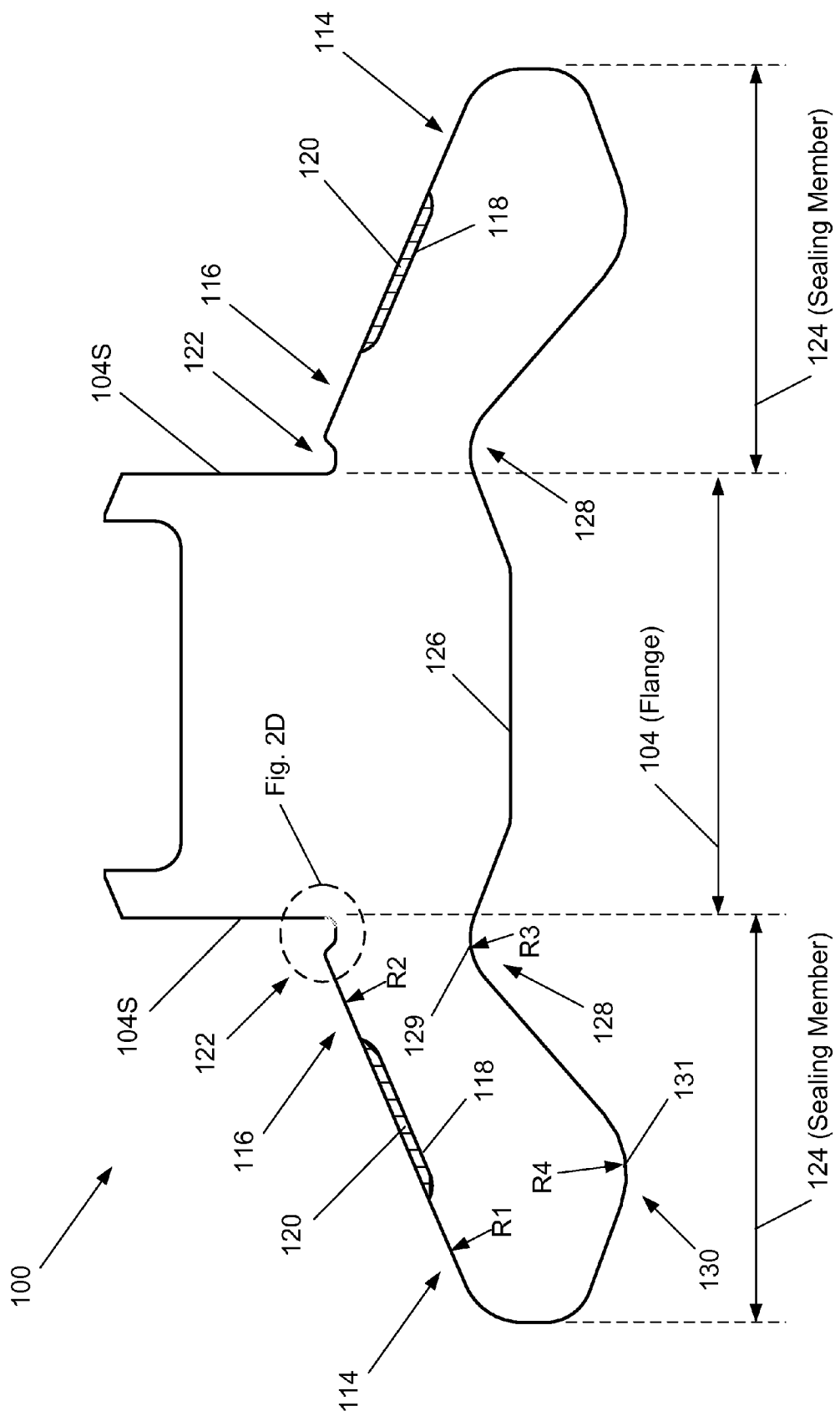

Further details of the structure of the illustrative metal seal ring 100 are shown in FIG. 2C, which is an enlarged cross-sectional view of a portion of the metal seal ring 100. As shown therein, a plurality of first sealing areas 114 and a plurality of second sealing areas 116 are formed on the front side 106 of the metal seal ring 100. In the depicted example, the first sealing areas 114 have a radiused outer surface (R1) and the second sealing areas 116 have a second radiused outer surface (R2). In some embodiments, R1 and R2 may be equal to one another, but such a situation may not be required in all applications. A metal filled recess 118 is formed in the front side 106 between the first and second sealing areas 114, 116. The recess 118 is filled with a relatively softer material 120 that is softer than the metal of the first and second sealing areas 114, 116, i.e., the material 120 is softer than the metal material that forms the body of the metal seal ring 100. For example, in one embodiment, the integral body of the metal seal ring 100 may be made of a high yield strength alloy, while the softer material 120 may be made of a metal, a metal alloy or an elastomer. The purpose of the relatively softer material 120 will be discussed more fully below. The recess 118 may be initially machined into the body of the metal seal ring 100, and thereafter, in the case where the softer material 120 is a metal, the recess 118 may be over-filled (by plating) with the softer metal. A machining process may be performed to remove excess amounts of the softer metal. In the case where the softer material 120 is an elastomer, the recess 118 may be filled with the elastomer material or installed as an elastomer ring. Also depicted in FIG. 2C is a notch 122 that is formed into the sealing members 124 adjacent the sides of the flange 104. The notch 122 is generally directed inward toward the longitudinal axis 110 of the opening 101. Further details of the notch 122 will be discussed below with reference to FIG. 2D.

With continuing reference to FIG. 2C, the sealing members 124 extend outwardly away from the flange 104 of the metal seal ring 100, i.e., away from the projection of the sidewalls 104S as depicted by the dashed lines in FIG. 2C. The axial length (in a direction parallel to the longitudinal axis 110 (see FIG. 2B) of the flange 104 as well as the axial length of the sealing members 124 are depicted in FIG. 2C. As mentioned previously, the back side surface 108 is comprised of an inner surface 126, a plurality of protrusions 130 and a plurality of recesses 128. Each of the recesses 128 is axially positioned between the flange 104 and one of the protrusions 130. The axial length of the inner surface 126 may vary depending upon the particular application. In the depicted example, the inner surface 126 has a shorter axial length than the axial length of the flange 104. In one embodiment, the inner surface 126 is a cylindrical surface, but such a configuration may not be employed in all applications. In the depicted example, the recesses 128 have a bottom surface 129 that defines the radially outermost surface of the recesses 128 (as measured from the longitudinal axis 110 in a direction parallel to the axis of symmetry 112 (see FIG. 2B)). In the example shown herein, the bottom surface 129 of the recesses 128 is a radiused surface (R3). In the depicted example, the protrusions 130 have an outer surface 131 that defines the radially innermost surface of the protrusions 130 (as measured from the longitudinal axis 110 in a direction parallel to the axis of symmetry 112 (see FIG. 2B)). In the example shown herein, the outer surface 131 of the protrusions 130 is a radiused surface (R4). In some embodiments, the radius R4 may be greater than the radius R3, although such a configuration may not be present in all applications.

Figure 2D:
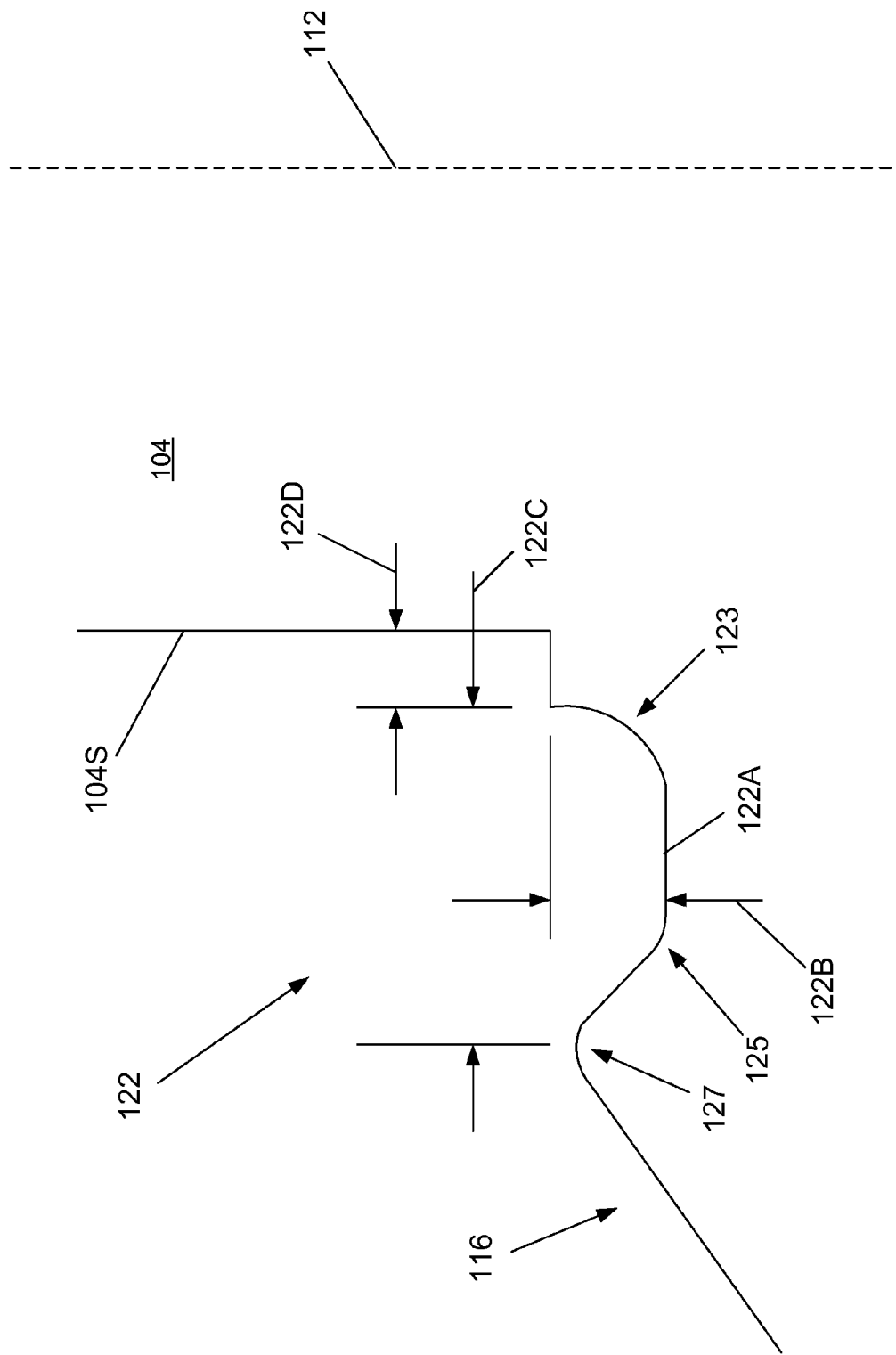

FIG. 2D is an enlarged cross-sectional view of a portion of the metal seal ring 100 that provides further illustrative details of the illustrative notch 122 disclosed herein. As shown therein, the notch 122 is formed such that it extends into the sealing member 124 in a direction toward the longitudinal axis 110. In one illustrative example, the notch 122 has a bottom surface 122A that may be in the form of a cylindrical surface, although such a configuration may not be present in all applications. Radiused surfaces 123, 125 may be provided between the bottom surface 122A and the sidewalls of the notch 122 so as to eliminate stress risers. Another radiused surface 127 is provided between the notch 122 and the second sealing area 116. The overall depth 122B and overall width 122C of the notch 122 as well as the axial distance 122D between the beginning of the notch 122 and the edge or side 104S of the flange 104 may vary depending upon the particular application. However, the notches 122 should be located between the flange 104 and the second sealing areas 116.

As will be appreciated by those skilled in the art after a complete reading of the present application, there are several unique aspects of the novel metal seal ring 100 disclosed herein, at least some of which will be discussed with reference to FIGS. 2E-2H. As shown in FIG. 2E, the radially innermost surface 131 of the protrusions 130 is located at a radial distance 131X, as measured from the longitudinal axis 110 in a direction parallel to the axis of symmetry 112, and at an axial distance 131Y, as measured from the axis of symmetry 112 in a direction parallel to the longitudinal axis 110. The radially outermost surface 129 of the recesses 128 is located at a radial distance 129X, as measured from the longitudinal axis 110 in a direction parallel to the axis of symmetry 112, and at an axial distance 129Y, as measured from the axis of symmetry 112 in a direction parallel to the longitudinal axis 110. As depicted, the radial distance 131X to the surface 131 is less than the radial distance 129X to the surface 129, while the axial distance 131Y to the surface 131 is greater than the axial distance 129Y to the surface 129. Also note that the radial distance 126X of the inner surface 126 of the flange 104 from the longitudinal axis 110 of the metal seal ring 100 is less than the radial distance 129X (to the surface 129 of the recesses 128) but greater than the radial distance 131X (to the surface 131 of the protrusions 130). In one illustrative embodiment, the metal seal ring 100 is sized and configured such that the ratio of the distances 129Y/131Y falls within the range of about 0.38-0.63, while the ratio of distances 129X/131X falls within the range of about 0.79-1.32. In one very particular embodiment, the ratio of the distances 129Y/131Y may be about 0.5067 and the ratio of the distances 129X/131X may be about 1.0534. These relative ratios are important to the function and operation of the metal seal ring 100 as it provides sufficient flexibility so as to insure that sealing surfaces 114, 116 of the metal seal ring 100 seal in the desired order and to improve the sealing capacity and performance of the metal seal ring 100. Additionally, the unique structure of the metal seal ring 100, including the ratios discussed above, insures that the metal seal ring 100 is shaped so as to optimize load sharing and stiffness distribution.

Figure 2F:
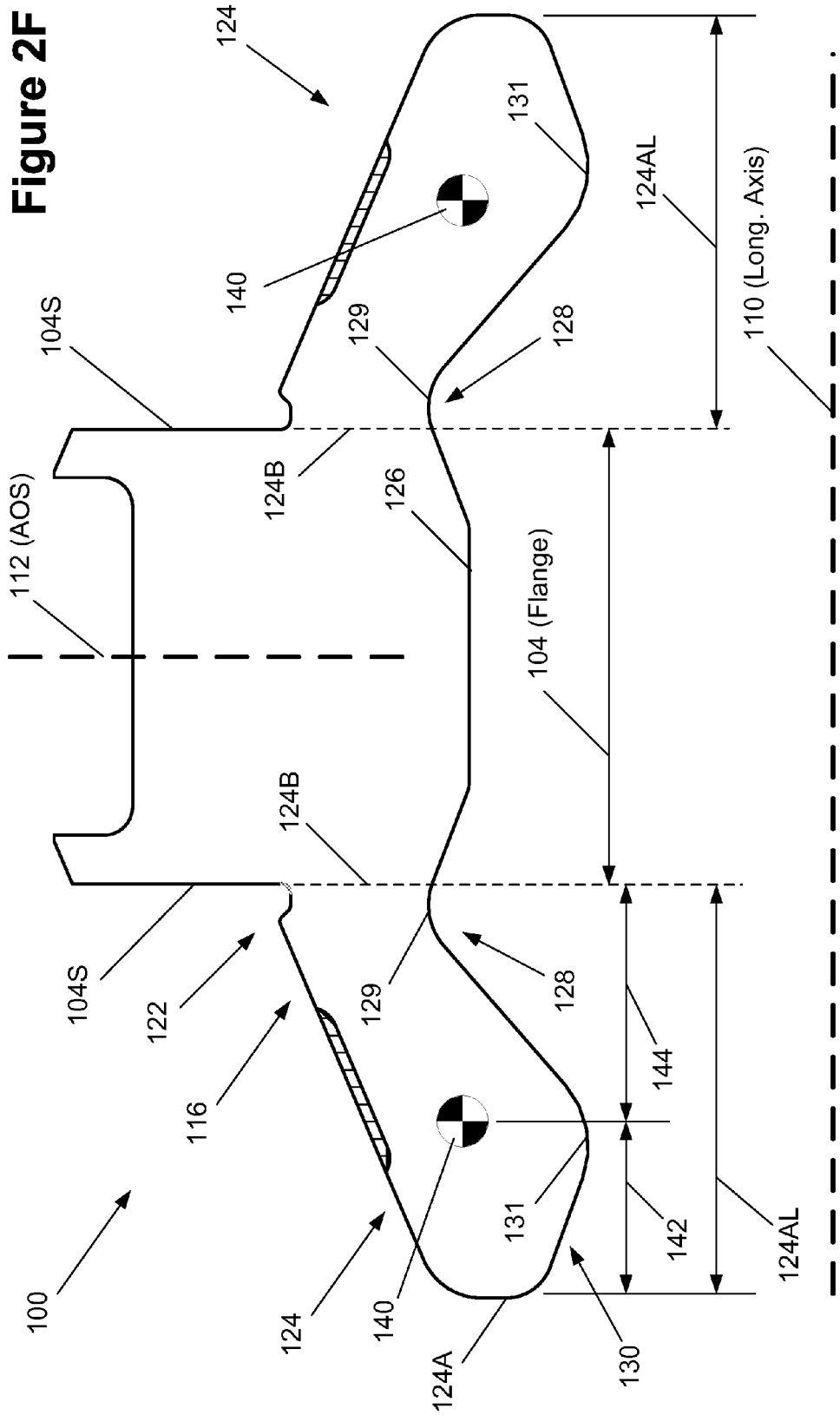

With reference to FIG. 2F, the sealing members 124 of the metal seal ring 100 have a distal end 124A and a proximal end 124B (at a location where the sealing member 124 engages an imaginary extension of the side surfaces 104S of the flange 104, as depicted in dashed lines in FIG. 2F). As used herein and in the attached claims, the flange 104 shall be understood to be the substantially rectangular shaped portion of the metal seal ring 104 that is defined by sidewalls 104S as extended through the body of the seal ring 100, as depicted in dashed lines in FIG. 2F. The sealing members 124 have an axial length 124AL that extends from the proximal end 124B to the distal end 124A. Each of the sealing members 124 has a centroid 140, the center of which is axially located at a position such that the axial distance 142 from the centroid 140 to the distal end 124A of the seal member 124 (as measured in a direction parallel to the longitudinal axis 110) is less than the axial distance 144 from the center of the centroid 140 to the proximal end 124B of the seal member 124. As shown, the center of the centroid 140 of the seal members 124 disclosed herein is located at an axial distance 144 from the proximal end 124B of the sealing member 124 that is greater than one-third (⅓) of the total axial length 124AL of the sealing member 124.

Figure 2G:
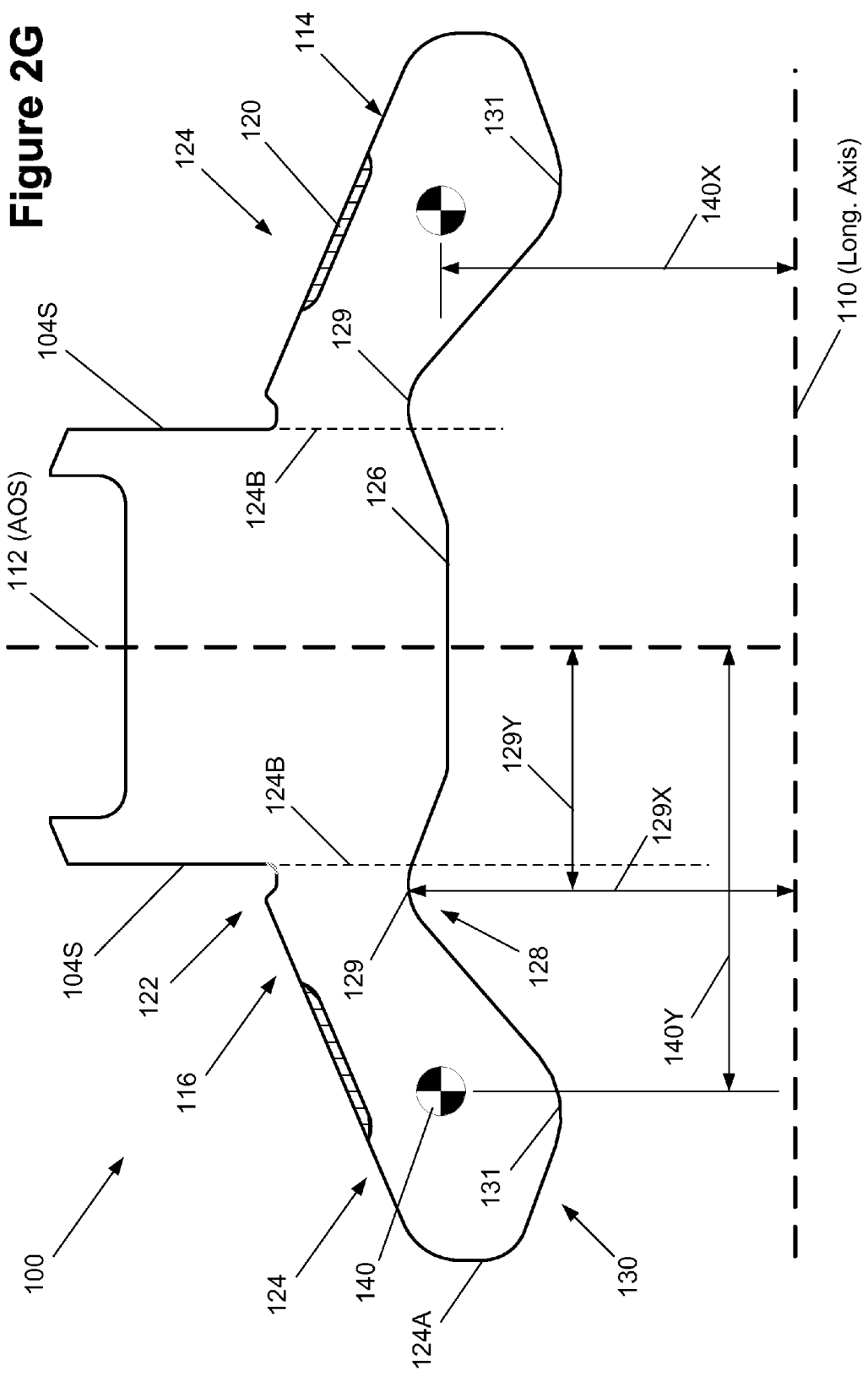

Additionally, with reference to FIG. 2G, the center of the centroid 140 is located at a radial distance 140X from the longitudinal axis 110 (as measured in a direction parallel to the axis of symmetry 112) and at an axial distance 140Y from the axis of symmetry 112 (as measured in a direction parallel to the longitudinal axis 110). In one embodiment of the seal 100 disclosed herein, the bottom surface 129 of the recesses 128 is positioned at a radial distance 129X from the longitudinal axis 110 that is equal to or greater than the radial distance 140X to of the center of the centroid 140. Thus, in one embodiment, the center of the centroid 140 of the sealing members 124 disclosed herein may be positioned more radially inward than the bottom surface 129 of the recesses 128.

Figure 2H:
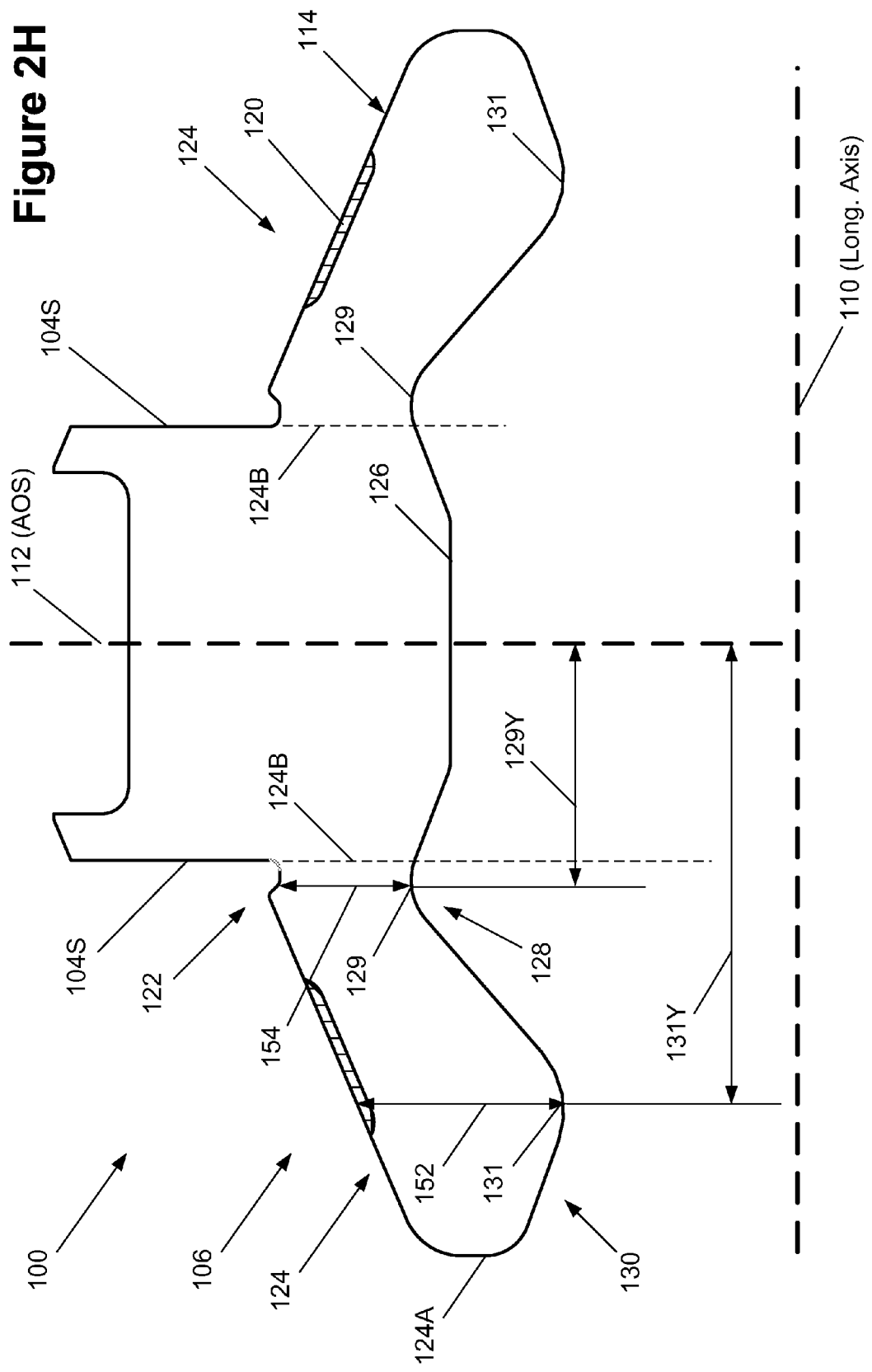

With reference to FIG. 2H, the sealing members 124 of the metal seal ring 100 are designed to have different thicknesses along the axial length of the sealing members 124. More specifically, a radial thickness 152 of the sealing members 124 from the radially innermost surface 131 of the protrusions 130 to the front side 106 (as measured through the surface 131 at an axial distance 131Y from the axis of symmetry 112 in a direction parallel to the axis of symmetry 112) is greater than the radial thickness 154 of the sealing members 124 from the radially outermost surface 129 of the recesses 128 to the front side 106 or notch 122 (as measured through the surface 129 at an axial distance 129Y from the axis of symmetry 112 in a direction parallel to the axis of symmetry 112). In one particular example, the radial thickness 154 may be less than one-half the radial thickness 152. Another unique feature of the metal seal ring 100 disclosed herein relates to the relative sizes of the axial distance 140Y to the center of the centroid 140 (see FIG. 2G) and the axial distance 131Y to the radially innermost surface 131 (see FIG. 2H). In general, the dimension 131Y should be greater than or equal to the dimension 140Y.

Based upon the foregoing, those skilled in the art will appreciate that the novel metal seal ring 100 disclosed herein is unique relative to previous metal seal rings. In general, the metal seal ring 100 disclosed herein has been specifically designed such that more of the mass of the sealing members 124 is positioned axially farther away from the axis of symmetry 112. This is accomplished by forming the recesses 128 nearer the axis of symmetry 112 while forming the relatively larger protrusion 130 closer to the distal end 124A of the sealing members 124. This effectively makes the sealing members 124 more "flexible" than prior art metal seal rings wherein the back surface of such seal rings tended to be more or less substantially cylindrical surfaces, thereby resulting in a generally "stiffer" metal seal ring. Additionally, providing the inwardly directed notches 122 in the sealing members 124 provides additional "flexibility" to the sealing members 124. As a result of the increased flexibility of the metal seal ring 100 disclosed herein, a properly sealed connection between two components may be more readily achieved.

Figure 2I:
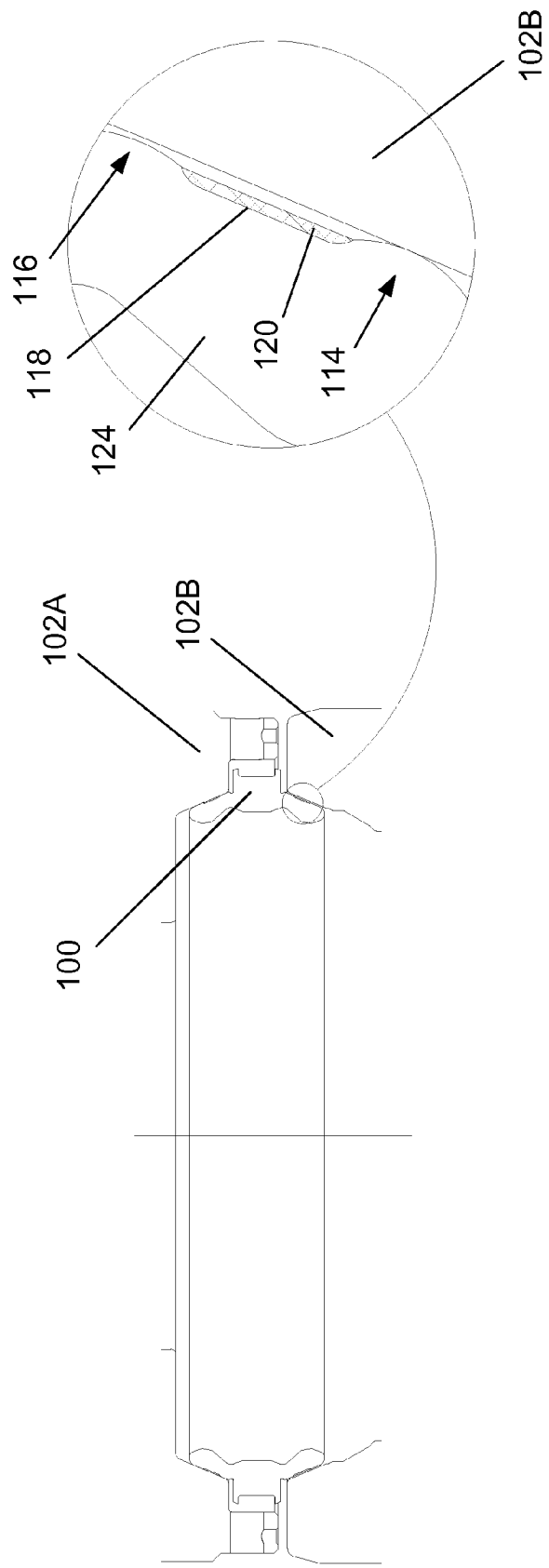
Figure 2J:
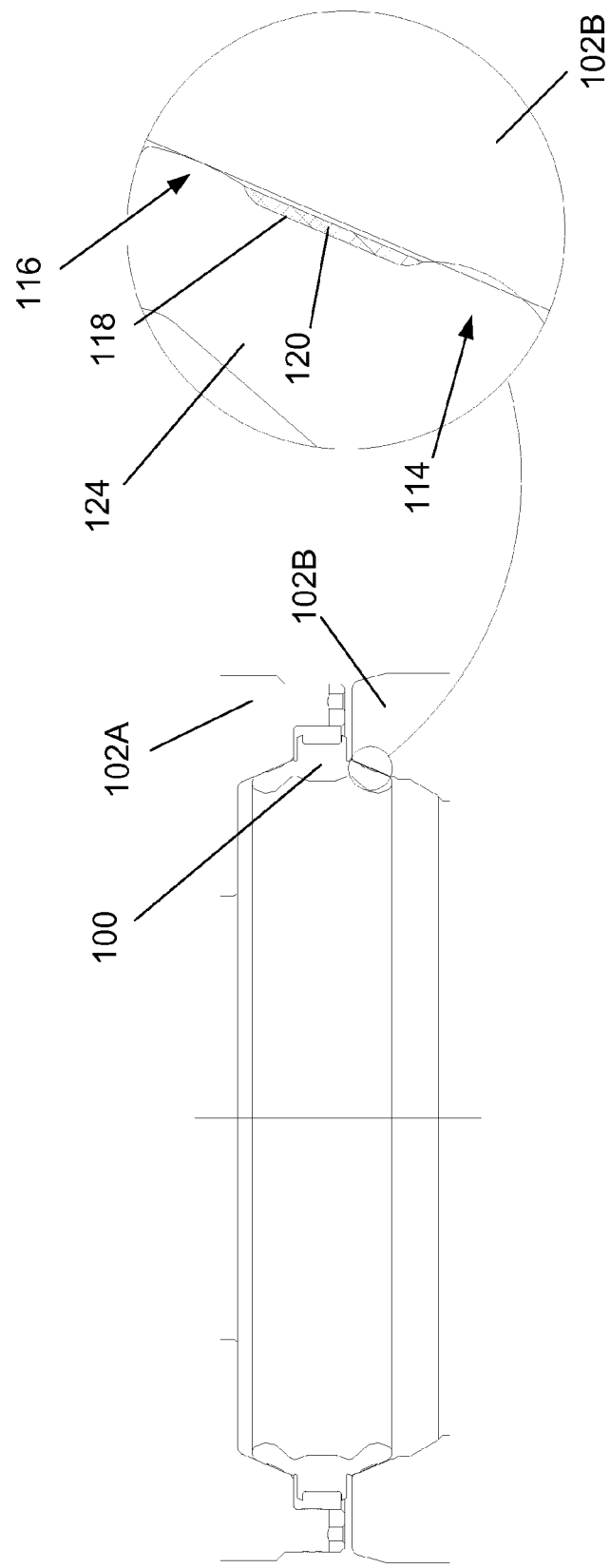
Figure 2K:
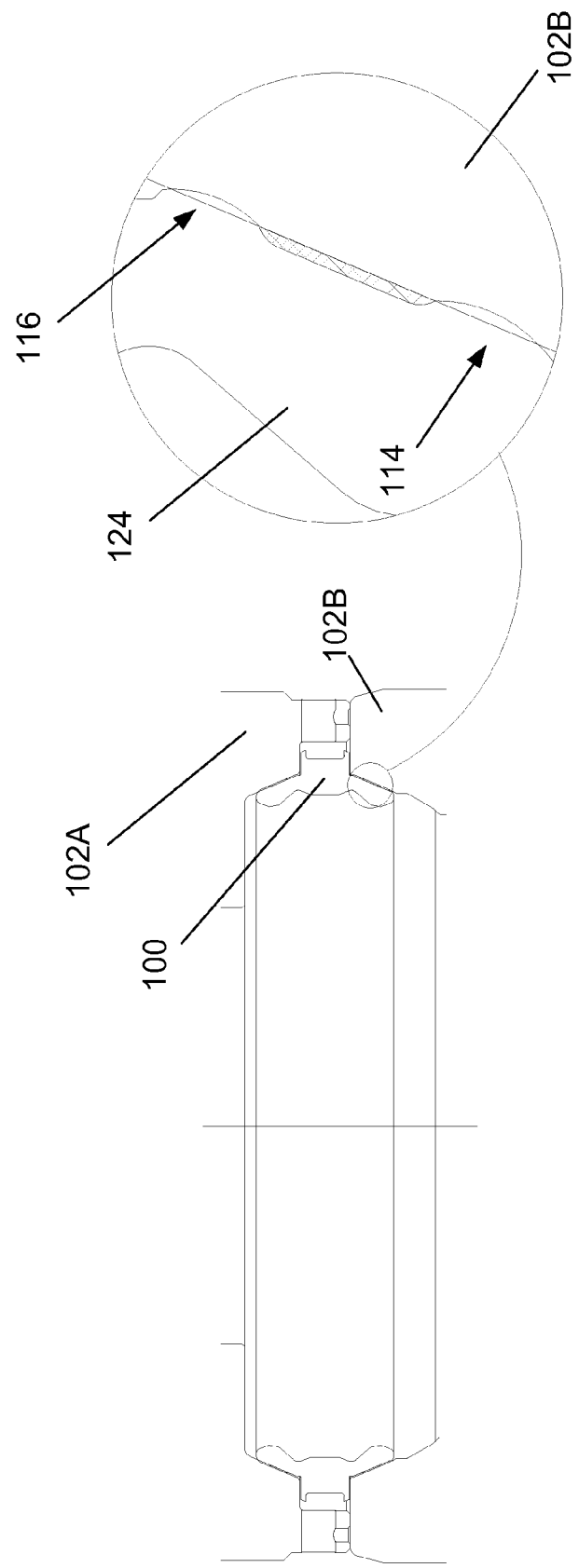

FIGS. 2I-2K depict one illustrative sealing sequence for the novel metal seal ring 100 disclosed herein. In general, the first metal sealing areas 114 are designed to provide a seal against the internal pressure within the sealed components 102A, 102B, while the second sealing areas 116 are designed to provide a seal against any external pressure, e.g., hydrostatic pressure in a subsea application. The softer material 120 in the recesses 118 may, in some situations, contact the sealing faces of the components 102A, 102B, but such a situation may not occur in all applications or under all operating conditions. In the event that the area occupied by the softer material 120 does contact the sealing faces of the components 102A, 102B, a lower reaction force will be generated due to the presence of the relatively softer material 120 as compared to the reaction force that would be generated if the softer material 120 were not present and portions of the seal body contacted the sealing surfaces on the components 102A, 102B. By reducing this reaction force, it reduces the loss of the reaction forces at the first and second sealing areas 114, 116 so that the loss of sealing capacity is reduced. FIG. 2I depicts the metal seal ring 100 at a point where the seal ring 100 disclosed herein forms an initial seal against the sealing surfaces of the first and second components 102A, 102B. At this point, the first sealing areas 114 contact the sealing surfaces of the components 102A, 102B, but there is no contact between the second sealing areas 116 or the area occupied by the softer material 120 and the sealing surface of the components 102A, 102B. FIG. 2J depicts the metal seal ring 100 at a point where the first sealing areas 114 have deformed (as indicated by the dashed lines) and the second sealing areas 116 are in contact with the sealing surfaces of the components 102A, 102B, but there is still no contact between the area occupied by the softer material 120 and the sealing surfaces of the components 102A, 102B. In the example shown in FIG. 2J, the second sealing areas 116 are depicted as being partially deformed. FIG. 2K depicts the metal seal ring 100 at a point where it is fully engaged with the sealing surfaces of the components 102A, 102B. In this example, the softer material 120 is also engaged with the sealing surfaces of the components 102A, 102B. Note that both the first sealing areas 114 and the second sealing areas 116 are fully deformed at this point.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modi-fled and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

What is claimed:

1. A metal seal ring having a longitudinal axis and an axis of symmetry that is normal to said longitudinal axis, comprising:
   a flange, said axis of symmetry extending though said flange;
   a sealing front side surface comprised of a plurality of first sealing areas and a plurality of second sealing areas, each of said second sealing areas being located between said flange and one of said first sealing areas; and
   a non-sealing back side surface, said non-sealing back side surface comprising:

a plurality of spaced-apart protrusions, each of which has a radially innermost surface that is located at a first radial distance from said longitudinal axis and a first axial distance from said axis of symmetry; and a plurality of recesses, each of which is located between one of said protrusions and said axis of symmetry, each recess having a radially outermost surface that is located at a second radial distance from said longitudinal axis and a second axial distance from said axis of symmetry, wherein said second radial distance is greater than said first radial distance and said second axial distance is less than said first axial distance.

2. The metal seal ring of claim 1, wherein said non-sealing back side surface further comprises an inner surface that is positioned between said plurality of recesses, at least a portion of said inner surface being located a third radial distance from said longitudinal axis, wherein said third radial distance is less than said second radial distance and greater than said first radial distance.

3. The metal seal ring of claim 2, wherein said at least a portion of said inner surface is located on said axis of symmetry.

4. The metal seal ring of claim 2, wherein said inner surface is a cylindrical surface.

5. The metal seal ring of claim 4, wherein a first of said plurality of recesses is positioned between a first edge of said inner surface and a first one of said protrusions, and a second of said plurality of recesses is positioned between a second edge of said inner surface and a second one of said protrusions.

6. The metal seal ring of claim 1, wherein said first and second sealing areas are convex radiused surfaces.

7. The metal seal ring of claim 1, wherein said first and second sealing areas are separated by a recess containing a material that is softer than a metal material of said first and second sealing areas, wherein said softer material is one of a metal or an elastomer.

8. The metal seal ring of claim 1, further comprising a plurality of notches that extend into said sealing front side surface, each of said notches being located between said flange and one of said second sealing areas.

9. The metal seal ring of claim 8, wherein each of said notches comprises a bottom cylindrical surface.

10. The metal seal ring of claim 1, wherein a ratio of said second axial distance to said first axial distance falls within a range of about 0.38-0.63, and a ratio of said second radial distance to said first radial distance falls within a range of about 0.79-1.32.

11. A metal seal ring having a longitudinal axis and an axis of symmetry that is normal to said longitudinal axis, comprising:

a flange, said axis of symmetry extending though said flange;

a plurality of sealing members extending from said flange, each of said sealing members comprising a sealing front side surface comprised of a plurality of first sealing areas and a plurality of second sealing areas, each of said second sealing areas being located between said flange and one of said first sealing areas, each of said sealing members, when viewed in a cross-section that includes said longitudinal axis of said seal ring, having an axial length from said flange as measured in a direction parallel to said longitudinal axis and a centroid that is located at a centroid axial distance from said flange as measured in a direction parallel to said longitudinal axis, wherein said centroid axial distance is greater than one-third of said axial length of said sealing member; and a non-sealing back side surface.

12. A metal seal ring having a longitudinal axis and an axis of symmetry that is normal to said longitudinal axis, comprising:

a flange, said axis of symmetry extending though said flange;

a plurality of sealing members extending from said flange, each of said sealing members comprising a sealing front side surface comprised of a plurality of first sealing areas and a plurality of second sealing areas, each of said second sealing areas being located between said flange and one of said first sealing areas, each of said sealing members, when viewed in a cross-section that includes said longitudinal axis of said seal ring, comprising:

a plurality of spaced-apart protrusions, each of which has a radially innermost surface that is located at a first axial distance from said axis of symmetry as measured in a direction parallel to said longitudinal axis; and a centroid, wherein a center of said centroid is located a centroid axial distance from said axis of symmetry, as measured in a direction parallel to said longitudinal axis, wherein said first axial distance is greater than or equal to said centroid axial distance; and a non-sealing back side surface.

13. The metal seal ring of claim 12, wherein said seal ring further comprises a recess that is located between said protrusion and said axis of symmetry, said recess having a radially outermost surface that is located at a first radial distance from said longitudinal axis and said center of said centroid is positioned at a centroid radial distance from said longitudinal axis, and wherein said first radial distance is greater than or equal to said centroid radial distance.

14. The metal seal ring of claim 12, wherein said radially innermost surface is located at a first radial distance from said longitudinal axis and said center of said centroid is positioned at a centroid radial distance from said longitudinal axis, and wherein said centroid radial distance is greater than said first radial distance.

15. A metal seal ring having a longitudinal axis and an axis of symmetry that is normal to said longitudinal axis, comprising:

a flange, said axis of symmetry extending though said flange; and a plurality of sealing members extending from said flange, each of said sealing members comprising:

a sealing front side surface comprising a first sealing area and a second sealing area, wherein said second sealing area is located between said flange and said first sealing area; and a non-sealing back side surface, said non-sealing back side surface comprising:

a protrusion which has a radially innermost surface and a first radial thickness as measured from said radially innermost surface to said sealing front side surface along a line that is parallel to said axis of symmetry; and a recess that is located between said protrusion and said axis of symmetry, said recess having a radially outermost surface and a second radial thickness as measured from said radially outermost surface to said sealing front side surface along a line that is parallel to said axis of symmetry, wherein said second radial thickness is less than said first radial thickness.

16. The metal seal ring of claim 15, wherein said second radial thickness is less than one-half of said first radial thickness.

17. A metal seal ring having a longitudinal axis and an axis of symmetry that is normal to said longitudinal axis, comprising:
- a flange, said axis of symmetry extending though said flange;
- a sealing front side surface comprised of a plurality of first sealing areas and a plurality of second sealing areas, each of said second sealing areas being located between said flange and one of said first sealing areas; and
- a non-sealing back side surface, said non-sealing back side surface comprising:
  - a plurality of spaced-apart protrusions, each of which has a radially innermost surface that is located at a first radial distance from said longitudinal axis and a first axial distance from said axis of symmetry; and
  - a plurality of recesses, each of which is located between one of said protrusions and said axis of symmetry, each recess having a radially outermost surface that is located at a second radial distance from said longitudinal axis and a second axial distance from said axis of symmetry, wherein a ratio of said second axial distance to said first axial distance falls within a range of about 0.38-0.63, and a ratio of said second radial distance to said first radial distance falls within a range of about 0.79-1.32.

18. The metal seal ring of claim 17, wherein said non-sealing back side surface further comprises a cylindrical inner surface that is positioned between said plurality of recesses and wherein each of said plurality of recesses is positioned between said cylindrical inner surface and one of said protrusions.

19. The metal seal ring of claim 17, wherein said first and second sealing surfaces are convex radiused surfaces.

20. The metal seal ring claim of 17, wherein said first and second sealing surfaces are separated by a recess containing a material that is softer than a metal material of said first and second sealing areas, wherein said softer material is one of a metal or an elastomer.

21. The metal seal ring of claim 17, further comprising a plurality of notches that extend into said sealing front side surface, each of said notches being located between said flange and one of said second sealing surfaces.

* * * * *